(12) United States Patent
Kubacki et al.

(10) Patent No.: US 7,839,345 B2
(45) Date of Patent: Nov. 23, 2010

(54) TOP MOUNT MAST ANTENNA REINFORCEMENT

(75) Inventors: Brian Kubacki, Royal Oak, MI (US); Nikia M. Williams, Detroit, MI (US); Mark Courtright, Allen Park, MI (US); Rob J. Scollard, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 12/058,676

(22) Filed: Mar. 29, 2008

(65) Prior Publication Data

US 2009/0243945 A1    Oct. 1, 2009

(51) Int. Cl.
*H01Q 1/32* (2006.01)
(52) U.S. Cl. .................. 343/715; 343/713; 403/252
(58) Field of Classification Search .............. 343/711, 343/713, 715; 403/197, 252, 259
See application file for complete search history.

(56) References Cited

U.S. PATENT DOCUMENTS

| | | | | |
|---|---|---|---|---|
| 2,468,391 A * | 4/1949 | Cejka | ................. | 174/153 A |
| 3,138,660 A * | 6/1964 | Cejka | ................. | 174/153 A |
| 3,555,551 A * | 1/1971 | Gronlund | ................. | 343/715 |
| 4,431,332 A | 2/1984 | Dieges | ................. | 403/252 |
| 5,157,409 A * | 10/1992 | Hamin | ................. | 343/715 |
| 6,236,377 B1 | 5/2001 | Hussaini | ................. | 343/882 |
| 6,469,678 B1 * | 10/2002 | Pullen | ................. | 343/888 |
| 6,714,171 B2 | 3/2004 | Haussler | ................. | 343/888 |
| 7,004,666 B2 | 2/2006 | Kozlovski | ................. | 403/252 |
| 7,088,297 B2 | 8/2006 | Nakano | ................. | 343/713 |
| 7,338,316 B2 * | 3/2008 | Blickle | ................. | 439/546 |
| 7,436,367 B2 * | 10/2008 | Blickle | ................. | 343/713 |
| 2006/0103579 A1 | 5/2006 | Blickle | ................. | 343/711 |

\* cited by examiner

*Primary Examiner*—Tho G Phan
(74) *Attorney, Agent, or Firm*—Greg Brown, Esq.; Miller Law Group, PLLC

(57) ABSTRACT

A mounting apparatus for a top mount mast antenna includes a secondary part to stabilize the antenna attachment screws extending through the antenna base into the fender panel of the automotive vehicle on which the antenna is mounted. The secondary part is preferably formed of nylon to serve as a retaining device for the attachment screws so that the screws do not loosen, which ultimately causes separation of the antenna from the fender panel and a corresponding deformation of the fender panel. The secondary nylon part allows a flexible installation that can be accomplished before painting of the fender panel. The secondary part fits into the opening in the fender panel to mount on the peripheral circumference of the opening and extend outwardly form the opening below the fender panel to be positioned for engagement with the attachment screws connecting the base member of the antenna to the fender panel.

20 Claims, 3 Drawing Sheets

TOP MOUNT MAST ANTENNA REINFORCEMENT

FIELD OF THE INVENTION

This invention relates generally to the mounting of a radio antenna to an automotive vehicle and, more particularly, to a reinforcement member that will keep the antenna mount from loosening from the fender.

BACKGROUND OF THE INVENTION

Automotive vehicles are typically provided with a radio that requires an antenna to receive the radio signal. Although some radio antennas have been built into the windshield or other components of the vehicle, the most effective and inexpensive radio antenna is a mast antenna that is conventionally mounted on the fender of the vehicle and operatively connected to the radio to provide a radio signal thereto. As is often found on full size trucks, the mast antenna is mounted directly to the fender and is not retractable into the fender to protect the antenna from damage. Thus, after the antenna has been subjected to a number of car wash cycles and routine driving, the screws that attach the mast antenna to the fender can loosen. Eventually, the loosened mounting screws will lead to the antenna being separated from the fender, particularly when subjected to an aggressive car wash cycle. Usually, a forceful separation of the mast antenna from the fender on which the antenna is mounted results in a deformation of the fender.

An automobile antenna mounting structure for positioning a mast antenna within an opening formed into the fender of the vehicle is disclosed in U.S. Pat. No. 4,431,332, granted to Paul Dieges on Feb. 14, 1984. This antenna mounting structure included a base that partially passes through the opening and a retainer located below the fender surface. Pointed wings twist and a connecting ring bends causing the connecting ring between plates of the retainer to bend and permit the toothed upper edges of the retainer plates to engage a toothed surface of the base. In U.S. Pat. No. 6,714,171, issued to Bradley Haussler, et al on Mar. 30, 2004, the antenna mounting device asserts a compressive force between the antenna and the fender panel through use of a forcing cone and anchor, and a member that compresses the anchor and forcing cone into one another.

Quick attach antenna mounting devices are disclosed in U.S. Pat. No. 7,004,666, issued on Feb. 28, 2006, to David Kozlovski, and in U.S. Pat. No. 7,088,297, issued on Aug. 8, 2006, to Kazuya Nakano, et al. In both of these patents, the antenna mounting device asserts a clamping force onto the panel, such as the fender structure, to which the antenna is to be mounted. The clamping forces in the Kozlovski patent are asserted with a washer having a plurality of upwardly extending fingers that engage the underside of the fender panel and fixed into a clamping load by a nut threaded onto a portion of the antenna. The clamping forces in the Nakano patent are asserted onto the fender panel by a functionally equivalent legged washer that is located below the fender panel and clamped through engagement with a bolt that threads into the antenna base.

Another universal antennal mounting system is taught in U.S. Pat. No. 6,236,377, granted on May 22, 2001, to Saied Hussaini, et al, wherein rocker arms of a mounting member extend through the opening of the fender panel. The antenna is secured to the fender panel by pulling upwardly on the antenna mast so that the hands on the rocker arms contact the inner surface of the fender panel. A compressive load is placed on the antenna by a threaded apparatus that draws the antenna upwardly to clamp the fender panel between the threaded apparatus above the fender panel and the rocker arms below the fender panel. U.S. Pat. application Publication No. 2006/0103579, by Gunther Blickle, published on May 18, 2006, discloses an apparatus for mounting an antenna on an automotive vehicle by a bayonet plate that is engaged with bolts the extend downwardly from the base plate of the antenna into slots formed in the bayonet plate. A compressive load is provided by spring washers engaged by a nut threaded onto a threaded part of the antenna.

None of the known prior art devices provide a mounting apparatus that will keep a screw mounted mast antenna from loosening and thus being subjected to a forceful separation from the fender panel. Accordingly, it would be desirable to provide a reinforcement device that would be operable to reinforce the mounting of the mast antenna onto the fender panel while securing the mounting screws from loosening.

SUMMARY OF THE INVENTION

It is an object of this invention to overcome the aforementioned disadvantages of the known prior art by providing a reinforcement for a top mount mast antenna that will secure the mounting screws from loosening.

It is another object of this invention to provide a low cost, effective antenna mounting system for supporting a mast antenna on an automotive fender panel.

It is an advantage of this invention that top mount mast antenna reinforcement provides installation flexibility.

It is a feature of this invention that the mast antenna mounting apparatus does not utilize a compressive design that clamps the antenna mounting device on the fender panel.

It is another feature of this invention that the reinforcement structure for the antenna mount is independent of the structural architecture of the vehicle.

It is still another feature of this invention that the reinforcement for the top mount mast antenna utilizes a nylon part to be engaged by the mounting screws.

It is another advantage of this invention that the nylon reinforcement part is highly resistant to changes due to temperature extremes.

It is still another feature of this invention that the nylon reinforcement part can be installed prior to assembly of the antenna, and even prior to the painting of the fender panel.

It is still another advantage of this invention that the reinforcement structure can be utilized on multiple vehicle lines, as the reinforcement structure is not dependent on vehicle architecture.

It is a further object of this invention to provide a top mount mast antenna reinforcement member that is durable in construction, inexpensive of manufacture, carefree of maintenance, facile in assemblage, and simple and effective in use.

These and other objects, features and advantages are accomplished according to the instant invention by providing a mounting apparatus for a top mount mast antenna that includes a secondary part to stabilize the antenna attachment screws extending through the antenna base into the fender panel of the automotive vehicle on which the antenna is mounted. The secondary part is preferably formed of nylon to serve as a retaining device for the attachment screws so that the screws do not loosen, which ultimately causes separation of the antenna from the fender panel and a corresponding deformation of the fender panel. The secondary nylon part allows a flexible installation that can be accomplished before painting of the fender panel. The secondary part fits into the opening in the fender panel to mount on the peripheral circumference of the opening and extend outwardly form the opening below the fender panel to be positioned for engagement with the attachment screws connecting the base member of the antenna to the fender panel.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
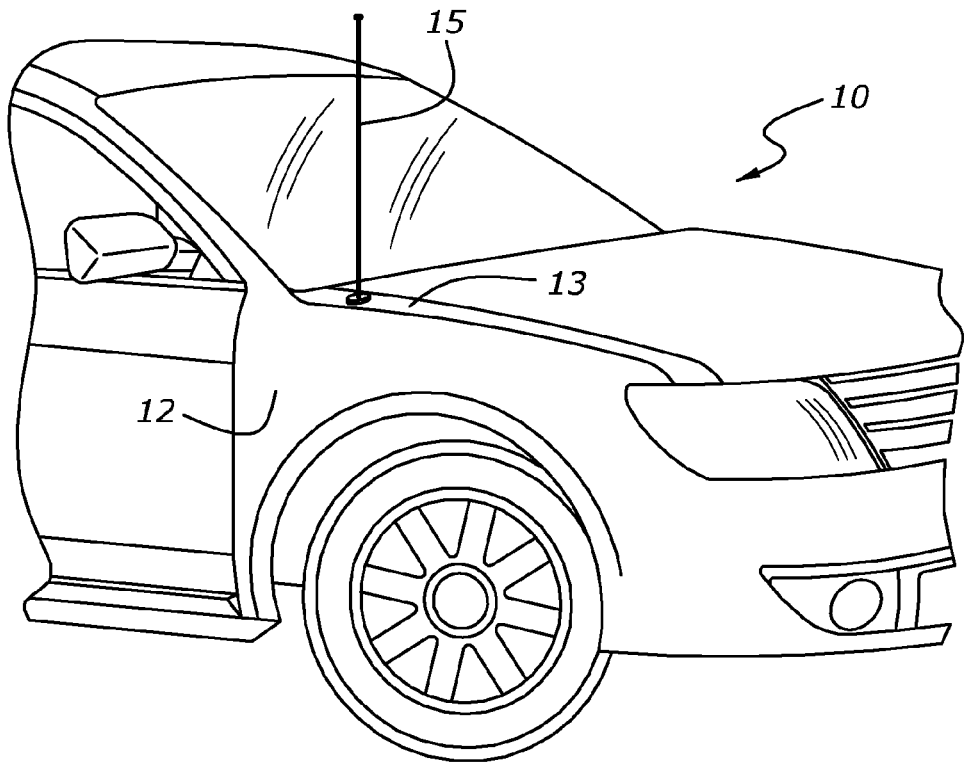
FIG. 1 is a partial perspective view of an automotive vehicle having a representative mast antenna mounted on the right front fender panel of the vehicle.

Referring to FIGS. 1-4, an automotive vehicle having a top mount mast antenna supported on a representative fender panel and incorporating the principles of the instant invention can best be seen. The automotive vehicle is shown in FIG. 1 with the representative antenna being mounted on the right front fender panel. One skilled in the art will recognize that the precise location of the mounting of the mast antenna is variable depending on the architecture of the vehicle and could be on either front fender panel, or even on either of the rear fender panels or other suitable support panel on the vehicle. Some automotive vehicles, particularly full sized trucks, have the antenna mounted directly to the vehicle's fender by screws passing through a mounting bracket into the fender. Such antenna mounting arrangements suffered from the screws loosening which presents the possibility of the antenna becoming separated from the fender on which the antenna was mounted. To prevent the mounting screws from loosening from the fender structure, a secondary part is provided to stabilize the antenna attachment screws.

The representative automobile 10 depicted in FIG. 1 is shown with the antenna 15 mounted on the right front fender 12 of the vehicle 10. The front fender 12 is manufactured with a mounting surface 13 thereon at which the antenna 15 is mounted. A top mast mounting apparatus 20 is provided to support the antenna 15 on and through the fender 12. The top mast mounting apparatus 20 includes a primary mounting collar 22 through which conventional mounting screws 24 are extended to engage the mounting surface 13 of the vehicle fender 12. A secondary mounting member 25 is added to the fender 12 to underlie the mounting surface 13 and engage the antenna 15, as will be described in greater detail below. The primary function of the secondary mounting member 25 is to be positioned for engagement with the mounting screws 24 to prevent the mounting screws 24 from loosening.

The secondary mounting member 25 is manufactured from a deformable material that will engage the threads of the mounting screws 24 to prevent the mounting screws from loosening. Preferably, the secondary mounting member 25 is formed from nylon. The secondary mounting member 25 includes a generally planar reinforcement disk 26 that is oriented below the mounting surface 13 of the vehicle fender 12 and has a sufficient size to permit engagement thereof with the mounting screws 24. The center of the reinforcement disk 26 is formed with a passageway 27 for the passage of the antenna 15. Integral with the reinforcement disk 26, the secondary mounting member 25 also includes a plurality of retention tabs 28 that project upwardly from the reinforcement disk 26 to pass through the opening 14 and engage the mounting surface 13 of the fender 12 and secure the secondary mounting part 25 in position on the fender 12.

Figure 3:
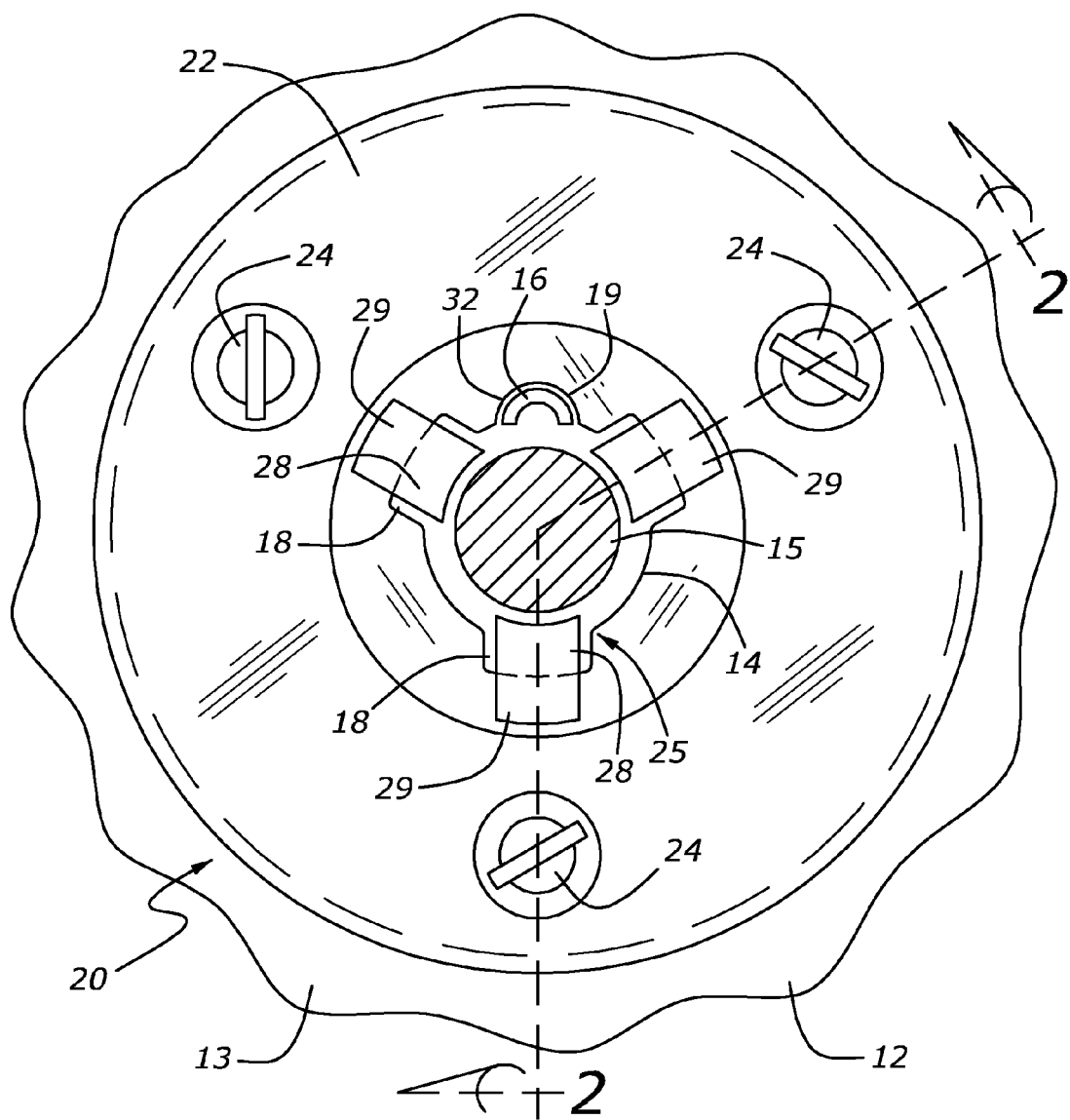
FIG. 3 is a top plan view of the mounting apparatus connecting the top mount mast antenna to the fender panel of the automotive vehicle, the antenna being shown in cross-section and the fender panel being broken away for purposes of clarity.
Figure 4:
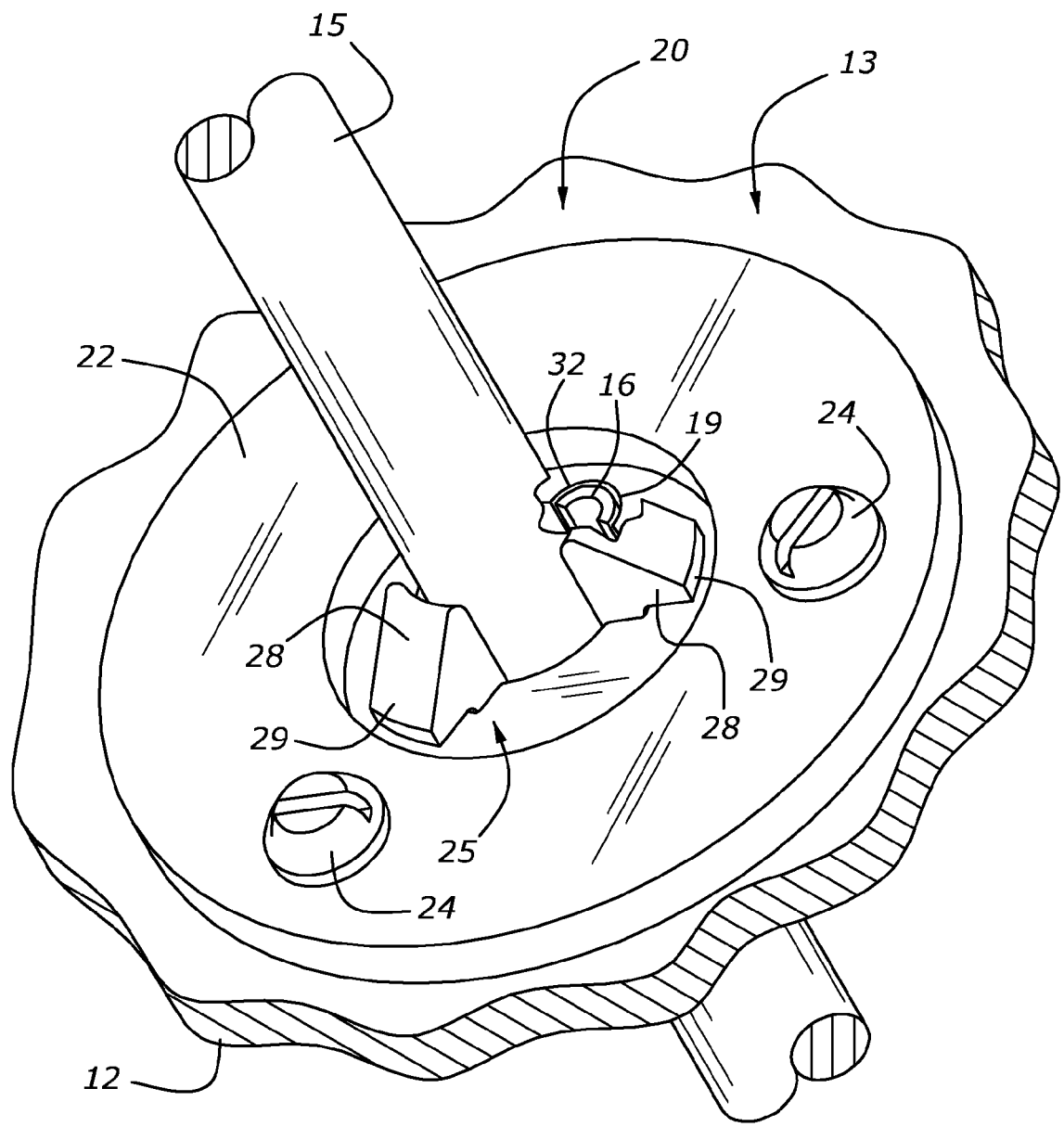
FIG. 4 is a perspective view of the mounting apparatus shown in FIG. 3.

Preferably, the opening 14 in the fender 12 is formed with a plurality of recesses 18 that are oriented respectively to receive the passage of the retention tabs 28 and to locate the retention tabs 28 between the fender structure 12 and the antenna 15. The retention tabs 28 are formed with retention clips 29 that overlap the mounting surface 13 of the fender 12 to secure the secondary mounting member 25 in place on the fender 12. The retention tabs 28 are spaced circumferentially around the passageway 27, as is best seen in FIGS. 3 and 4, and sized so that the individual retention tabs 28 will deflect inwardly when the secondary mounting member 25 is installed on the fender 12. The antenna 15 includes a semi-circular projection 16 that is receivable within a detent 19 formed in the fender 12 and a corresponding depression 32 in the reinforcement disk 26 located between two of the retention tabs 28 so that when properly positioned within the opening 14 the antenna projection 16 engages the detent 19 and the depression 32 to prevents the antenna 15 from rotating within the opening 14.

Figure 2:
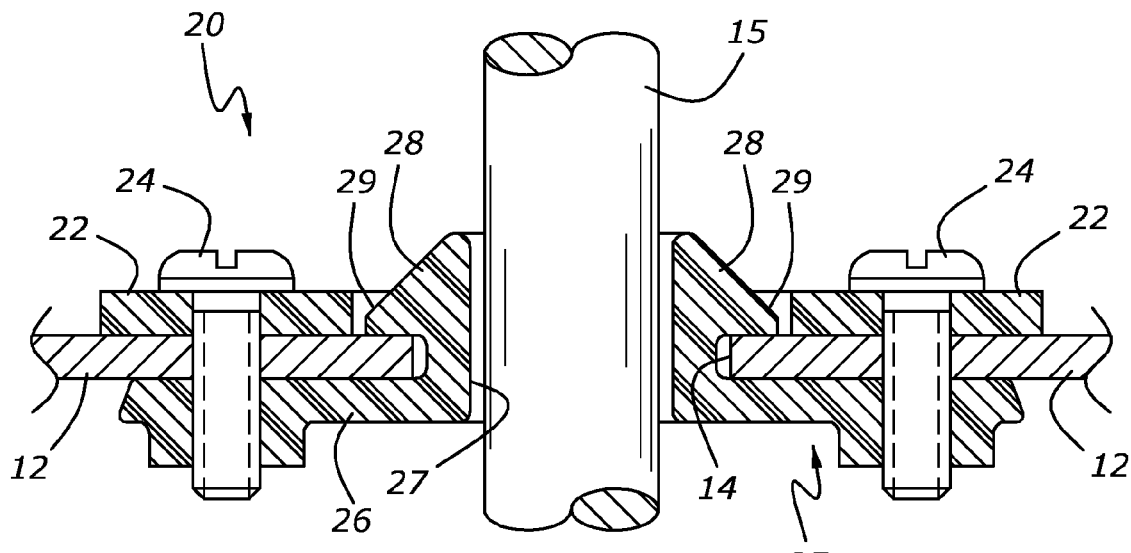
FIG. 2 is a cross-sectional view taken along lines 2-2 of FIG. 3 through the reinforcement member and base member of the antenna incorporating the principles of the instant invention.

As can be seen in FIGS. 2-4, the antenna 15 is located though the opening 14 in the fender and through the passageway 27 within the reinforcement disk 26 to extend above the fender and receive radio signals. The antenna 15 is mounted to the fender 12 by the primary mounting collar 22. The mounting screws 24 pass through the primary mounting collar 22 and through the fender 12 to engage the reinforcement disk 26 of the secondary mounting member 25. The deformable nylon reinforcement disk 26 engages the threads of the mounting screws 24 so that the screws 24 won't loosen without a predetermined minimum torque being imposed on the mounting screws 24 to cause turning thereof.

The retention tabs 28 with the overlying retention clips 29 deflect when installed and then snap into place on the fender 12 with the retention tabs 28 positioned within the recesses 18 so that the secondary mounting member 25 does not require engagement with the mounting screws 24 to be retained in position on the fender 12. Accordingly, the secondary mounting member 25 can be installed on the fender 12 at anytime in the assembly process prior to paint being applied to the fender. Preferably, the secondary mounting member 25 is installed on the fender at the location of manufacture of the fender 12 before being shipped to the assembly plant for installation on the vehicle 10.

The use of nylon, or other suitable polymer, provides a secondary mounting member 25 that is highly resistant to extreme temperatures, which enables the secondary mounting member 25 to be installed prior to painting the fender 12 and passage through e-coat baking ovens, as well as be able to withstand extreme environmental conditions. Furthermore, the simplicity of the design of the secondary mounting member 25 enables the secondary mounting member 25 to be utilized irrespective of the architecture of the vehicle 10 to provide a low cost alternative to the conventional crush-mount antenna mounting devices.

It will be understood that changes in the details, materials, steps, processes and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive vehicle having a structural surface for the mounting of an antenna to extend upwardly from the structural surface, the structural surface having an opening formed therein for the passage of the antenna, the antenna being associated with a primary mounting collar for the mounting of the antenna to the structural surface, said primary mounting collar being detachably connected to the structural surface by fasteners, the improvement comprising:
   a secondary mounting member constructed of a deformable material and including a reinforcement disk positioned below the structural surface for engagement with the fasteners by threading directly into said reinforcement disk to secure the fasteners from loosening without requiring a predetermined torque to be applied to the fasteners.

2. The automotive vehicle of claim 1 wherein said secondary mounting member is constructed of nylon.

3. The automotive vehicle of claim 1 wherein said secondary mounting member further includes a plurality of retention tabs projecting upwardly from said reinforcement disk to pass through said opening in the structural surface to support said secondary mounting member on said structural surface with said reinforcement disk being located below said structural surface.

4. The automotive vehicle of claim 3 wherein each said retention tab is formed with a retention clip that overlies the structural surface adjacent the opening to support said secondary mounting member on said structural surface.

5. The automotive vehicle of claim 4 wherein said opening is formed with a plurality of recesses to receive said retention tabs.

6. The automotive vehicle of claim 4 wherein said retention tabs are spaced circumferentially around a passageway formed in said reinforcement disk to permit the passage of said antenna.

7. The automotive vehicle of claim 6 wherein said reinforcement disk also includes a depression alignable with a detent formed at said opening in said structural surface to receive a projection on said antenna to prevent rotation of said antenna relative to said structural surface.

8. The automotive vehicle of claim 7 wherein said depression is formed in said reinforcement disk between two of said retention tabs.

9. A secondary support member cooperable with a primary mounting apparatus for mounting an antenna on a structural surface of an automotive vehicle having an opening formed therein for the passage of the antenna, said primary mounting apparatus including fasteners extending through said structural surface from said primary mounting apparatus, comprising:
   a reinforcement disk positioned below the structural surface for engagement with the fasteners to secure the fasteners from loosening without requiring a predetermined torque to be applied to the fasteners, said reinforcement disk having a passageway formed therein to permit passage of the antenna; and
   support structure integrally formed with said reinforcement disk to project upwardly therefrom around said passageway to pass through said opening and engage said structural surface.

10. The secondary support member of claim 9 wherein said support structure includes a plurality of retention tabs projecting upwardly from said reinforcement disk to pass through said opening in the structural surface to support said secondary mounting member on said structural surface.

11. The secondary support member of claim 10 wherein said retention tabs are spaced circumferentially around said passageway.

12. The secondary support member of claim 11 wherein said opening is formed with a plurality of recesses to receive said retention tabs.

13. The secondary support member of claim 12 wherein each said retention tab is formed with a retention clip that overlies the structural surface adjacent the opening to support said secondary mounting member on said structural surface.

14. The secondary support member of claim 12 wherein said secondary mounting member is constructed of nylon.

15. The secondary support member of claim 12 wherein said reinforcement disk also includes a depression between two of said retention tabs and alignable with a detent formed at said opening in said structural surface to receive a projection on said antenna to prevent rotation of said antenna relative to said structural surface.

16. An apparatus for mounting a top mast antenna on a structural surface of an automotive vehicle having an opening formed therein for the passage of the antenna through the structural surface, comprising:
   a primary mounting collar positionable on said structural surface and having mounting screws passing through said primary mounting collar and through said structural surface; and
   a secondary mounting member formed of deformable material and supported from said structural surface for engagement with said mounting screws by threading said mounting screws directly into said reinforcement disk causing deformation of said reinforcement disk to prevent said mounting screws from loosening unless a predetermined torque is applied to turn said mounting screws.

17. The apparatus of claim 16 wherein said secondary mounting member comprises:
   a reinforcement disk positioned below the structural surface for engagement with the mounting screws after passing through said structural surface, said reinforcement disk having a passageway formed therein to permit passage of the antenna; and
   support structure integrally formed with said reinforcement disk to project upwardly therefrom around said passageway to pass through said opening and engage said structural surface.

18. The apparatus of claim 17 wherein said support structure includes a plurality of retention tabs circumferentially spaced around said passageway and projecting upwardly from said reinforcement disk to pass through said opening in the structural surface to support said secondary mounting member on said structural surface.

19. The apparatus of claim 18 wherein each said retention tab is formed with a retention clip that overlies the structural surface adjacent the opening to support said secondary mounting member on said structural surface.

20. The apparatus of claim 19 wherein said secondary mounting member is constructed of nylon.

* * * * *